(12) United States Patent
Mantzanas et al.

(10) Patent No.: US 12,027,998 B2
(45) Date of Patent: Jul. 2, 2024

(54) CONTROL DEVICE, INVERTER, ASSEMBLY HAVING AN INVERTER AND AN ELECTRIC MACHINE, METHOD FOR OPERATING AN INVERTER AND COMPUTER PROGRAM

(71) Applicant: Valeo Siemens eAutomotive Germany GmbH, Erlangen (DE)

(72) Inventors: Panagiotis Mantzanas, Erlangen (DE); Daniel Kübrich, Schlüsselfeld (DE); Thomas Dürbaum, Baiersdorf (DE); Alexander Bucher, Nuremberg (DE); Alexander Pawellek, Erlangen (DE); Christian Hasenohr, Erlangen (DE); Harald Hofmann, Nuremberg (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 243 days.

(21) Appl. No.: 17/630,279

(22) PCT Filed: Jul. 27, 2020

(86) PCT No.: PCT/EP2020/071117
§ 371 (c)(1),
(2) Date: Jan. 26, 2022

(87) PCT Pub. No.: WO2021/018829
PCT Pub. Date: Feb. 4, 2021

(65) Prior Publication Data
US 2022/0337175 A1 Oct. 20, 2022

(30) Foreign Application Priority Data
Jul. 29, 2019 (DE) .................. 10 2019 120 439.9

(51) Int. Cl.
*H02M 7/53* (2006.01)
*H02M 7/5395* (2006.01)
(Continued)

(52) U.S. Cl.
CPC ...... *H02M 7/5395* (2013.01); *H02P 21/0089* (2013.01); *H02P 27/085* (2013.01)

(58) Field of Classification Search
CPC ........ H02M 3/073; H02M 3/10; H02M 3/135; H02M 3/137; H02M 3/28; H02M 3/315;
(Continued)

(56) References Cited

U.S. PATENT DOCUMENTS 7,663,329 B2 * 2/2010 Muta .................. H02M 7/53875
318/432
9,276,508 B2 * 3/2016 Nakazumi ........... H02P 21/0021
(Continued)

FOREIGN PATENT DOCUMENTS

DE 10 2008 052 923 A1 6/2009
DE 102017203668 A1 9/2018
EP 2940861 A2 11/2015

OTHER PUBLICATIONS

International Search Report and Written Opinion in corresponding International Application No. PCT/EP2020/071117, dated Oct. 14, 2020 (12 pages).
(Continued)

*Primary Examiner* — Jeffrey A Gblende
(74) *Attorney, Agent, or Firm* — Osha Bergman Watanabe & Burton LLP

(57) ABSTRACT

A control device (8) for an inverter (2) that feeds an electric machine (3), wherein the control device (8) is configured to provide pulse-width modulated switching signals (15) with a carrier frequency to drive switching elements (12) of the inverter (2), wherein the control device (8) is configured to determine the carrier frequency depending on operating point information that describes an operating point defined by a rotation speed and a torque of the electric machine (3) and, as the rotation speed increases and the magnitude of the torque falls, to increase the carrier frequency within an
(Continued)

operating region (22) that extends within a rotation speed interval with a lower rotation speed limit (23) differing from zero and with an upper rotation speed limit (24) lying in a power-limiting operating region (21) or field-weakening operating region.

14 Claims, 7 Drawing Sheets

(51) Int. Cl.
*H02P 21/00* (2016.01)
*H02P 27/08* (2006.01)

(58) Field of Classification Search
CPC .... H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 7/5395; H02M 7/483; H02M 1/0009; H02P 27/00; H02P 27/02; H02P 27/06; H02P 27/08; H02P 27/085

See application file for complete search history.

(56) References Cited

U.S. PATENT DOCUMENTS

| | | |
|---|---|---|
| 10,320,323 B1* | 6/2019 | Wu .................. H02P 21/22 |
| 2010/0052583 A1 | 3/2010 | Takamatsu et al. |
| 2011/0193506 A1* | 8/2011 | Hayashi .................. H02P 6/28 |
| | | 318/400.12 |
| 2015/0280619 A1 | 10/2015 | Marohl et al. |
| 2018/0076744 A1 | 3/2018 | Wolf et al. |
| 2020/0186077 A1* | 6/2020 | Spierling ................ H02H 7/08 |

OTHER PUBLICATIONS

German Search Report issued in German Application No. 10 2019 120 439.9 mailed on Jul. 13, 2023 (6 pages).

* cited by examiner

CONTROL DEVICE, INVERTER, ASSEMBLY HAVING AN INVERTER AND AN ELECTRIC MACHINE, METHOD FOR OPERATING AN INVERTER AND COMPUTER PROGRAM

The present invention relates to a control device for an inverter that feeds an electric machine, wherein the control device is configured to provide pulse-width modulated switching signals with a carrier frequency to drive switching elements of the inverter.

The invention additionally relates to an inverter, an assembly having an inverter and an electric machine, a method for operating an inverter and a computer program.

The increasing significance of electrically driven vehicles has brought inverters and their associated control devices for such application fields into the focus of industrial development efforts. Control devices of a type that provide pulse-width modulated switching signals with a constant carrier frequency to drive switching elements of the inverter are known.

Pulsed output voltages arise in the context of such a switching operation, and, particularly in specific regions of low torque, can lead to a high total harmonic distortion (THD) of the phase currents of the electric machine. As a result, however, undesirable mechanical vibrations develop in the electric machine.

The invention is therefore based on the object of reducing harmonic distortion in the operation of an inverter.

This object is achieved according to the invention by a control device of the type mentioned at the beginning that is configured to determine the carrier frequency depending on operating point information that describes an operating point defined by a rotation speed and a torque of the electric machine and, as the rotation speed increases and the magnitude of the torque falls, to increase the carrier frequency within an operating region that extends within a rotation speed interval with a lower rotation speed limit differing from zero and with an upper rotation speed limit lying in a power-limiting operating region or field-weakening operating region.

The invention is based on the recognition that a total harmonic distortion of output voltages of the inverter depends on the one hand on the carrier frequency which, when increased, causes the total harmonic distortion to fall, and depends on the other hand on the operating point of the electric machine. In the (first) operating region, if it is assumed that the carrier frequency remains constant, then, depending on the magnitude of the torque, only low switching losses nevertheless arise, but as the rotation speed however rises and the magnitude of the torque falls, increasing total harmonic distortion develops. There is therefore room for an increase in the carrier frequency, since higher switching losses—compared with operating at a constant carrier frequency—can be accepted in order to reduce or limit the total harmonic distortion. The total harmonic distortion and, consequently, the undesirable mechanical vibrations, are thus advantageously reduced.

The total harmonic distortion of output voltages is typically described for the purposes of this invention by a distortion measure that is a weighted combination of the frequency components of the output voltage of the inverter. Generally speaking, such a distortion measure $m_{THD}$ can be expressed in a formula as follows:

$$m_{THD} = \frac{1}{\hat{u}_{N_{AC}}} \sqrt{\sum_{n=1}^{\infty} (\alpha_n \cdot \hat{u}_n)^2}$$

$N_{AC}$ here describes a ratio between an electrical frequency of the electric machine $f_{AC}$ and a fundamental frequency $f_f$ of the output voltages $u_x$ of the inverter, and $\alpha_n$ are weighting factors. The output voltages as a function of time t are described by $$u_x(t) = \sum_{n=1}^{\infty} \hat{u}_n \cdot \cos(2\pi n f_f t + \varphi_{x,n})$$

For the particularly practically relevant case of an inverter with three output phases, $x \in \{RS, ST, TR\}$ is to be set in relation to the usual phase identifiers R, S and T.

As a possible special case of the distortion measure $m_{THD}$, to which the invention is not restricted, the weighted total harmonic distortion (WTHD) is to be seen as that in which the frequency components are weighted in accordance with their order. In that case $$\alpha_n = \begin{cases} 0 & \text{for } n = N_{AC} \\ \dfrac{N_{AC}}{n} & \text{otherwise} \end{cases}$$

and $$WTHD = \begin{cases} \dfrac{1}{\hat{u}_1} \sqrt{\sum_{n=2}^{\infty} \left(\dfrac{\hat{u}_n}{n}\right)^2} & \text{for } N_{AC} = 1 \\ \dfrac{1}{\hat{u}_{N_{AC}}} \sqrt{\sum_{n=1}^{N_{AC}-1} \left(\dfrac{N_{AC}}{n} \cdot \hat{u}_n\right)^2 + \sum_{N_{AC}+1}^{\infty} \left(\dfrac{N_{AC}}{n} \cdot \hat{u}_n\right)^2} & \text{for } N_{AC} > 1 \end{cases}$$

In the case of the control device according to the invention, it is preferred for the lower rotation speed limit to lie in a fundamental rotation speed operating region.

It can advantageously be provided with the control device according to the invention that a first boundary of the operating region extends from a first operating point whose rotation speed corresponds to the lower rotation speed limit, to a second operating point, whose rotation speed is greater than the lower rotation speed limit, and the magnitude of whose torque is greater than the magnitude of the torque of the first operating point. Alternatively or in addition, it can be provided that a second boundary of the operating region extends from a first operating point, whose rotation speed corresponds to the upper rotation speed limit, to a second operating point whose rotation speed is lower than the upper rotation speed limit and the magnitude of whose torque is greater than the magnitude of the torque of the first operating point.

A first preferred embodiment of the invention is described below, in which it can in particular be provided that the control device is configured to generate the pulse-width modulated switching signals through continuous pulse-width modulation, in particular space vector modulation.

In the first preferred embodiment it can be provided that the second operating point of the first boundary and of the second boundary are identical and/or lie in the power-limiting operating region or the field-weakening operating region and/or are separated from a maximum magnitude of the torque at the rotation speed of the respective operating point.

It can further be provided in the first preferred embodiment that the control device is configured to increase the carrier frequency with rising rotation speed, in particular independently of the torque, within a second operating region defined without overlap with the first operating region that includes operating points the magnitude of whose torque at a respective rotation speed is greater than the greatest magnitude of the torque in the first operating region at this rotation speed. It has been established that the torque in the second operating region, in which the carrier frequency values expediently are steadily adjacent to those of the first operating region, only has a very small influence, if at all, on the total harmonic distortion. In this respect, the definition of the second operating region enables an extension of the reduction of the total harmonic distortion to operating points of higher loading of the electric machine, in particular to full load operation. Full load operation can here be understood generally in the context of the invention as an operating mode that includes the operating points with the maximum magnitude of the torque for a respective rotation speed.

It can therefore be provided that the second operating region is located entirely in the power-limiting operating region or field-weakening operating region, and/or extends up to full load operation.

A second preferred embodiment of the invention is described below, in which it can in particular be provided that the control device is configured to generate the pulse-width modulated switching signals through discontinuous pulse-width modulation, in particular generalized discontinuous pulse-width modulation (GDPWM).

In the second preferred embodiment it is advantageous if the control device is configured to increase the carrier frequency with falling rotation speed and falling torque within a second operating region defined without overlap with the first operating region that includes operating points the magnitude of whose torque at a respective rotation speed is greater than the greatest magnitude of the torque in the first operating region at this rotation speed.

Alternatively or in addition, the control device according to the invention in the second preferred embodiment is configured to increase the carrier frequency with rising rotation speed and falling torque, or with rising rotation speed independently of the torque, within a third operating region defined without overlap with the first operating region, that includes operating points the magnitude of whose torque at a respective rotation speed is greater than the greatest magnitude of the torque in the first operating region at this rotation speed.

The third operating region typically includes operating points the magnitude of whose torque at a respective rotation speed is greater than the greatest magnitude of the torque at this rotation speed lying in the second operating region.

In the second preferred embodiment, the first operating region and/or the second operating region and/or the third operating region can extend up to full-load operation, and/or extend from the fundamental rotation speed operating region into the power-limiting operating region or the field-weakening operating region.

In an advantageous development of the control device according to the invention, it can further be provided that it is not configured to determine the carrier frequency below a predefined or predefinable minimal value. The possibility that the carrier frequency for low values of the rotation speed and the torque become so low that their ratio to the frequency of a respective phase current of the electric machine falls below a predefined minimum ratio is avoided in this way. Operating points at which the minimum value is specified can to that extent also be regarded as a further operating region.

To enable an implementation of the control device according to the invention with particularly little effort, it is preferably configured to select the carrier frequency from a characteristic map that assigns carrier frequency values to pairs of rotation speed values and torque values. The characteristic map can, for example, be realized through a look-up table. The control device typically comprises a memory unit in which the characteristic map is stored.

It can further be provided that the characteristic map describes an at least piece-wise linear assignment of the pairs and the carrier frequency values. It is alternatively possible that the characteristic map is defined by discrete pairs, and that the control device is configured to determine the carrier frequency through in particular linear interpolation of the carrier frequency values assigned to the discrete pairs.

As an alternative to the use of a characteristic map, the control device according to the invention can be configured to determine the carrier frequency by means of an analytical calculation specification from which the carrier frequency can be determined depending on the operating point.

The characteristic map or the calculation specification can, for example, be determined through measurement or simulation for a specific configuration of the inverter and of the electric machine.

The control device according to the invention can further be configured to determine an updated carrier frequency in each case on receipt of updated operating point information and/or after a predefined or predefinable period of time has elapsed and/or after the conclusion of an electrical period of the electric machine and/or after the completion of a period of a respective switching signal. The carrier frequency can thus be adapted to the instantaneous operating point at expedient points in time.

It is, further, possible that the control device according to the invention is configured to determine the operating point information from torque information received at an input and/or rotation speed information received at an input and/or depending on current information describing the phase currents feeding the electric machine received at an input, and/or to estimate the operating point information in the context of a control for determining the switching signals. The torque can in particular be determined from the current information.

The object on which the invention is based is further achieved by an inverter comprising switching elements that are interconnected so as to convert a voltage present at the input side, depending on the switching signals controlling the switching elements, into an alternating current for operating an electric machine, and a control device according to the invention.

The inverter can further comprise a DC link capacitor that is in particular designed as a single capacitor element or as a plurality of capacitor elements connected in parallel and/or in series.

The inverter can further comprise an analog-to-digital converter that is designed to convert analog measurement signals into the current information and/or the rotation speed information and/or the torque information.

The object on which the invention is based is further achieved by an assembly with an inverter according to the invention and an electric machine that can be operated by means of the inverter.

It is preferred here if the determination of the carrier frequency represents the following relationship:

$$f_{PWM}(M, f_{rot}) =$$

$$\begin{cases} f_{PWM,m_{THD}}(M, f_{rot}) & \text{for } m_{THD} \mid_{f_{PWM,min}} > \max(m_{THD} \mid_{f_{PWM,losses}}) \\ f_{PWM,min} & \text{for } m_{THD} \mid_{f_{PWM,min}} \leq \max(m_{THD} \mid_{f_{PWM,losses}}) \end{cases}$$

with $$f_{PWM,m_{THD}}(M, f_{rot}) = g(m_{THD} \mid_{f_{PWM,min}}, \max(m_{THD} \mid_{f_{PWM,losses}}), f_{PWM,min})$$

and $$f_{PWM,losses}(M, f_{rot}) = \frac{\max(P_{tot} \mid_{f_{PWM,min}}) - P_c}{P_S \mid_{f_{PWM,min}}} \cdot f_{PWM,min}$$

wherein $f_{PWM}(M, f_{rot})$ describes the carrier frequency to be determined depending on the torque M and the rotation speed $f_{rot}$, $m_{THD}$ describes a distortion measure for the total harmonic distortion of output voltages of the inverter, $f_{PWM,min}$ describes a predefined or predefinable minimum carrier frequency, $f_{PWM,losses}(M, f_{rot})$ describes a carrier frequency that depends on the torque M and the rotation speed $f_{rot}$ taking the maximum of the total losses of the inverter at the minimum carrier frequency $\max(P_{tot}\mid_{f_{PWM,min}})$, switching losses at the minimum carrier frequency $P_S\mid_{f_{PWM,min}}$ and conductive losses $P_c$ into consideration, $f_{PWM,m_{THD}}(M, f_{rot})$ describes a carrier frequency depending on the torque M and the rotation speed $f_{rot}$, taking the distortion measure at the minimum carrier frequency $m_{THD}\mid_{f_{PWM,min}}$ and the maximum of the distortion measure at the carrier frequency $\max(m_{THD}\mid_{f_{PWM,losses}})$ that depends on the losses into consideration, and $g(m_{THD}\mid_{f_{PWM,min}}, \max(m_{THD}\mid_{f_{PWM,losses}}), f_{PWM,min})$ describes a function, in particular determined through simulation or measurement, of $m_{THD}\mid_{f_{PWM,min}}$, $\max(m_{THD}\mid_{f_{PWM,losses}})$ and $f_{PWM,min}$.

The following can apply if the WTHD is used as the distortion measure:

$$f_{PWM,m_{THD}}(M, f_{rot}) = \frac{m_{THD} \mid_{f_{PWM,min}}}{\max(m_{THD} \mid_{f_{PWM,losses}})} \cdot f_{PwM,min}.$$

The object on which the invention is based can further be achieved by a method for operating an inverter for supplying an electric machine, comprising the following steps carried out by a control device: determining a carrier frequency of pulse-width modulated switching signals for operation of the inverter depending on operating point information that describes an operating point defined by a rotation speed and a torque of the electric machine in such a way that the carrier frequency is increased, as the rotation speed increases and the magnitude of the torque falls, within an operating region that extends within a rotation speed interval with a lower rotation speed limit differing from zero and an upper rotation speed limit lying in a power-limiting operating region or field-weakening operating region; and providing the switching signals for switching elements of the inverter.

The object on which the invention is based is finally achieved by a computer program comprising commands which, when the program is executed by a computer, cause this to execute the steps of the method according to the invention carried out by the control device.

All of the explanations relating to the control device according to the invention, to the inverter according to the invention and to the assembly according to the invention can be applied in an analogous manner to the method according to the invention and the computer program according to the invention, so that the above-described advantages can also be achieved with these.

Further advantages and details of the present invention emerge from the exemplary embodiments described below and on the basis of the drawings. These are schematic illustrations in which.

Figure 1:
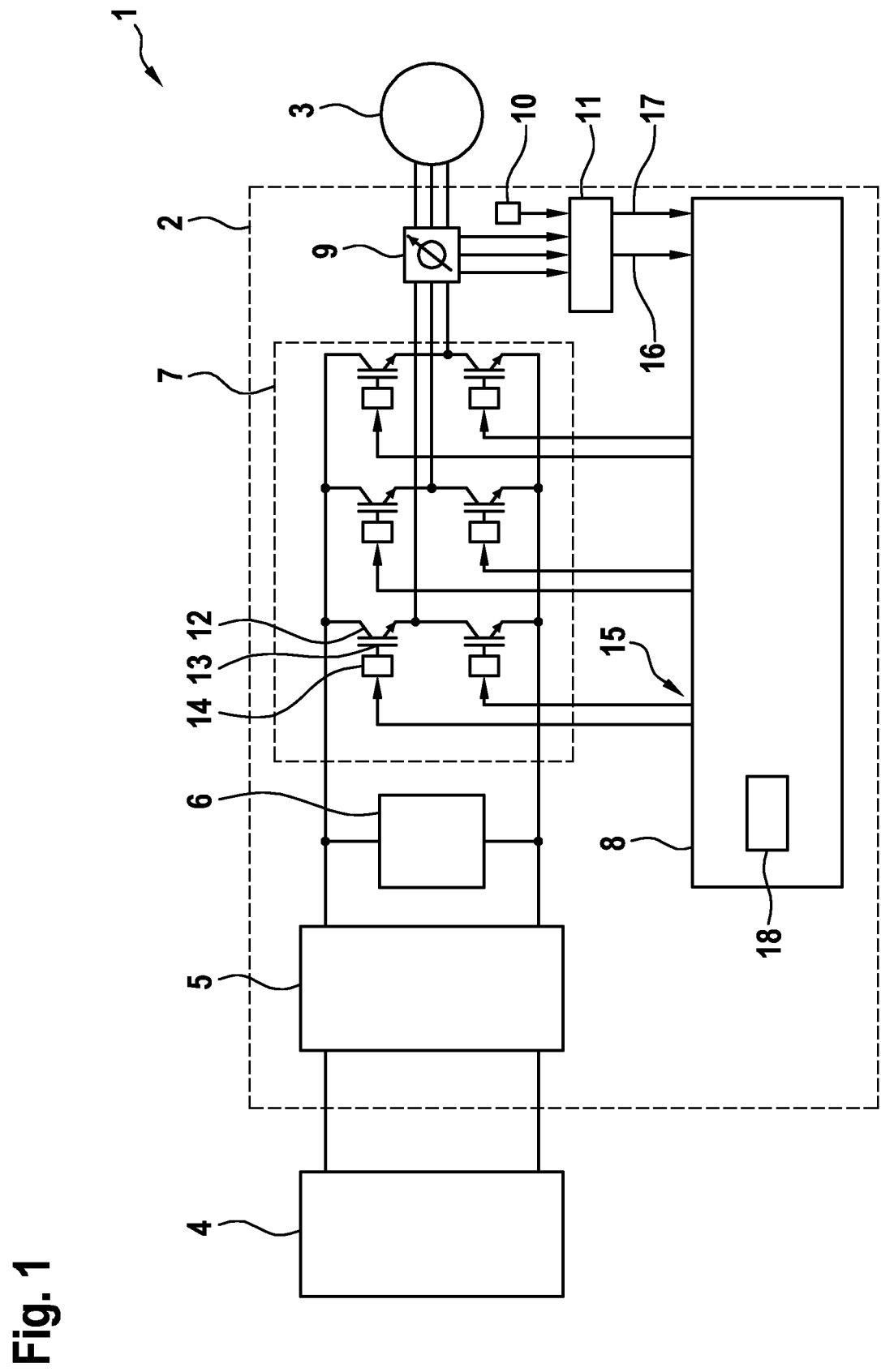
FIG. 1 shows a block diagram of an exemplary embodiment of an assembly according to the invention with an exemplary embodiment of an inverter according to the invention and an exemplary embodiment of a control device according to the invention.

FIG. 1 is a block diagram of an exemplary embodiment of an assembly 1, comprising an exemplary embodiment of an inverter 2 and an electric machine 3 that is configured to drive a vehicle that can be partially or fully electrically driven. The assembly 1 further comprises a DC voltage source 4 that is designed in the present case as a high-voltage battery.

The inverter 2 comprises a filter device 5 that is designed in the present case as an EMC filter, a DC link capacitor 6, a power unit 7, an exemplary embodiment of a control device 8, a first measuring device 9, a second measuring device 10 and an analog-to-digital converter device 11.

The power unit 7 comprises a plurality of switching elements 12 that are designed as semiconductor switching elements, for example as IGBTs or as power MOSFETs. The switching elements 12 are connected in pairs to form half-bridges. A driver 14 is connected in front of a control input 13 of a respective switching element 12. For reasons of clarity, only one switching element 12 and one driver 14 have been given reference signs here. The drivers 14 receive pulse-width modulated switching signals 15 from the control device 8 that are provided such that a voltage for feeding the electric machine 3 is made available at a respective tap of the half-bridges. The power unit 7 therefore converts a DC link voltage, smoothed by the DC link capacitor 6, into a voltage, having three phases in this case, depending on the switching signals 15.

The first measuring device 9 is configured to acquire the phase currents and to provide measurement signals to the analog-to-digital converter device 11 which converts the analog measurement signals of the first measuring device 9 into digital current information 16. The second measuring device 10 is accordingly configured to acquire a rotation speed of the electric machine 3 and to provide measurement signals to the analog-to-digital converter device 11 which converts the analog measurement signals of the second measuring device 10 into digital rotation speed information 17. The control device 8 receives the current information 16 and the rotation speed information 17 at its input.

On the basis of the current information 16 and the rotation speed information 17 the control device 8 determines operating point information that describes an operating point defined by a rotation speed and a torque of the electric machine 3. The control device 8 is configured to determine a carrier frequency of the pulse-width modulated switching signals 15. For this purpose, the control device 8 comprises a memory unit 18 in which a characteristic map that assigns carrier frequency values to pairs of rotation speed values and torque values, is stored.

The control device 8 selects a corresponding carrier frequency value from the characteristic map on the basis of the operating point information.

Figure 2:
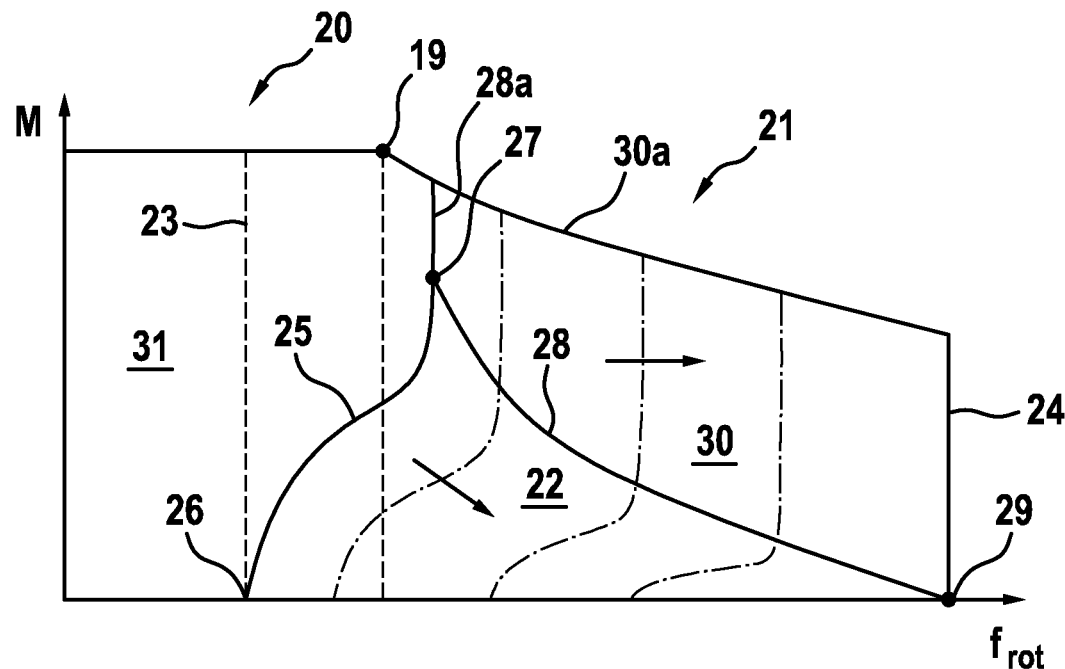
FIG. 2 shows a torque-rotation speed diagram on which operating regions relating to operation of the assembly shown in FIG. 1 have been drawn.

FIG. 2 is a torque-rotation speed diagram on which operating regions when operating the assembly shown in FIG. 1 have been drawn, wherein a torque is indicated with M and a rotation speed with hot. In the present exemplary embodiment, the switching signals 15 have been determined through continuous space vector modulation (SVM).

The diagram illustrates the characteristic map that describes an association between the pairs and the carrier frequency values. A corner operating point 19 is first shown in FIG. 2, describing the magnitude of the maximum torque when transferring from a fundamental rotation speed operating region 20 into a power-limiting operating region 21 or into a field-weakening operating region. Selected isolines of the carrier frequency values are shown by dash-dotted lines.

A first operating region 22 extends within a rotation speed interval with a lower rotation speed limit 23 differing from zero and with an upper rotation speed limit 24 lying in a power-limiting operating region 21 or a field-weakening operating region. A first boundary 25 of the first operating region 22 extends from a first operating point 26 lying in the fundamental rotation speed operating region, whose rotation speed corresponds to the lower rotation speed limit 23, to a second operating point 27, whose rotation speed is greater than the lower rotation speed limit 23, and the magnitude of whose torque is greater than the magnitude of the torque of the first operating point 26. The second operating point 27 lies in the power-limiting operating region 21 or the field-weakening operating region, and is spaced apart from a maximum amplitude of the torque at the rotation speed of the second operating point 27.

A second boundary 28 of the first operating region 22 extends from a first operating point 29, whose rotation speed corresponds to the upper rotation speed limit to a second operating point that is identical to the second operating point 27 of the first boundary 25.

The control device 8 is configured to increase the carrier frequency within the first operating region 22 with rising rotation speed and falling magnitude of the torque. This is symbolized, here and below, by an arrow.

A second operating region 30 that is defined not to overlap with the first operating region 22, comprises operating points, the magnitude of whose torque at a respective rotation speed is greater than the greatest magnitude of the torque at this rotation speed lying in the first operating region. The second operating region 30 is located entirely in the power-limiting operating region 21 or the field-weakening operating region, and extends up to full load operation 30a that is described by a line in the characteristic map at which the maximum possible magnitude of the torque is present for a respective rotation speed. The control device 8 is configured to increase the carrier frequency within the second operating region 30 with rising rotation speed, independently of the torque.

The control device 8 is, finally, configured not to determine the carrier frequency below a predefined minimum value. A further operating region 31 is drawn in this respect, in which the minimum value is specified. The further operating region 31 comprises operating points on the lower rotation speed side of the first boundary 25 and a boundary 28a of the second operating region 30.

In summary, the characteristic map for the operating regions 22, 30, 31 forms the following relationship:

$$f_{PWM}(M, f_{rot}) =$$

$$\begin{cases} f_{PWM,m_{THD}}(M, f_{rot}) & \text{for } m_{THD}|_{f_{PWM,min}} > \max(m_{THD}|_{f_{PWM,losses}}) \\ f_{PWM,min} & \text{for } m_{THD}|_{f_{PWM,min}} \leq \max(m_{THD}|_{f_{PWM,losses}}) \end{cases}$$

with $$f_{PWM,WTHD}(M, f_{rot}) = \frac{WTHD|_{f_{PWM,min}}}{\max(WTHD|_{f_{PWM,losses}})} \cdot f_{PWM,min}$$

and $$f_{PWM,losses}(M, f_{rot}) = \frac{\max(P_{tot}|_{f_{PWM,min}}) - P_c}{P_S|_{f_{PWM,min}}} \cdot f_{PWM,min}$$

wherein $f_{PWM}(M, f_{rot})$ describes the carrier frequency to be determined depending on the torque M and the rotation speed $f_{rot}$, WTHD describes a weighted total harmonic distortion as an exemplary distortion measure for total harmonic distortions of output voltages of the inverter 2, $f_{PWM,min}$ describes the minimum carrier frequency, $f_{PWM,losses}(M, f_{rot})$ describes a carrier frequency that depends on the torque M and the rotation speed $f_{rot}$ taking the maximum of the total losses at the minimum carrier frequency $\max(P_{tot}|_{f_{PWM,min}})$, switching losses at the minimum carrier frequency $P_S|_{f_{PWM,min}}$ and conductive losses $P_c$ into consideration, and $f_{PWM,WTHD}(M, f_{rot})$ describes a carrier frequency depending on the torque M and the rotation speed $f_{rot}$, taking the weighted distortion at the minimum carrier frequency $WTHD|_{f_{PWM,min}}$ and the maximum of the weighted total distortion measure at the carrier frequency max $(WTHD|_{f_{PWM,losses}})$ that depends on the losses into consideration.

The control device 8 is configured to update the carrier frequency regularly. This is, for example, done on receipt of updated operating point information, after a predefined or predefinable period of time has elapsed, after completion of an electrical period of the electric machine 3 or after completion of a period of a respective switching signal 15. Combinations of the updating events referred to above are also possible.

Figure 3:
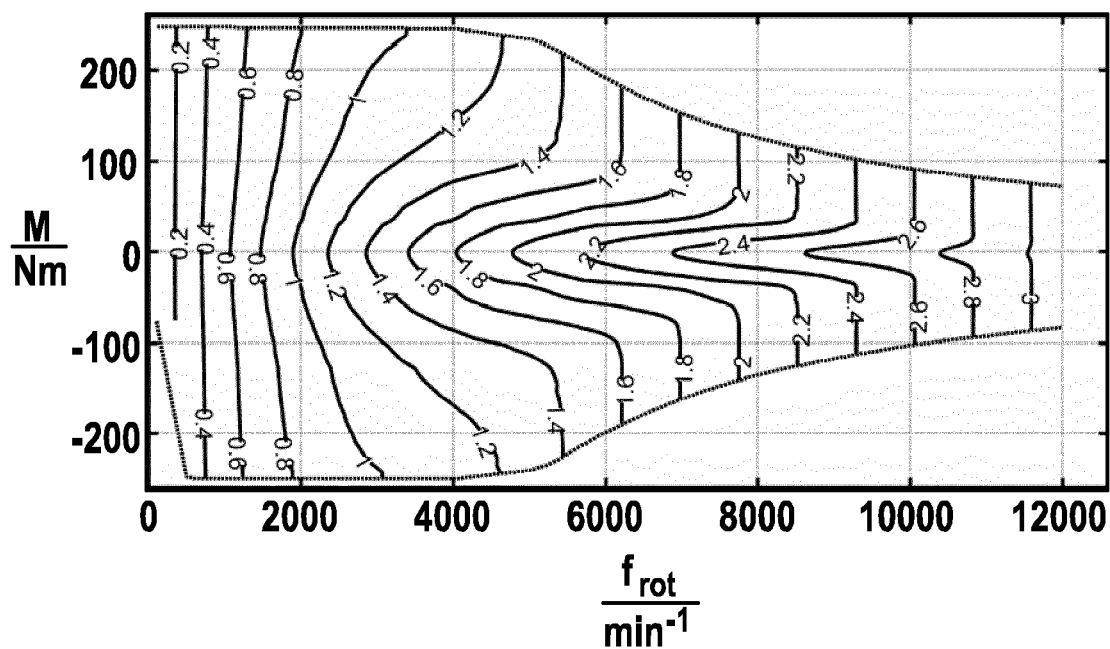
FIG. 3 shows a torque-rotation speed diagram on which the WTHD has been drawn for an assembly according to the prior art.
Figure 4:
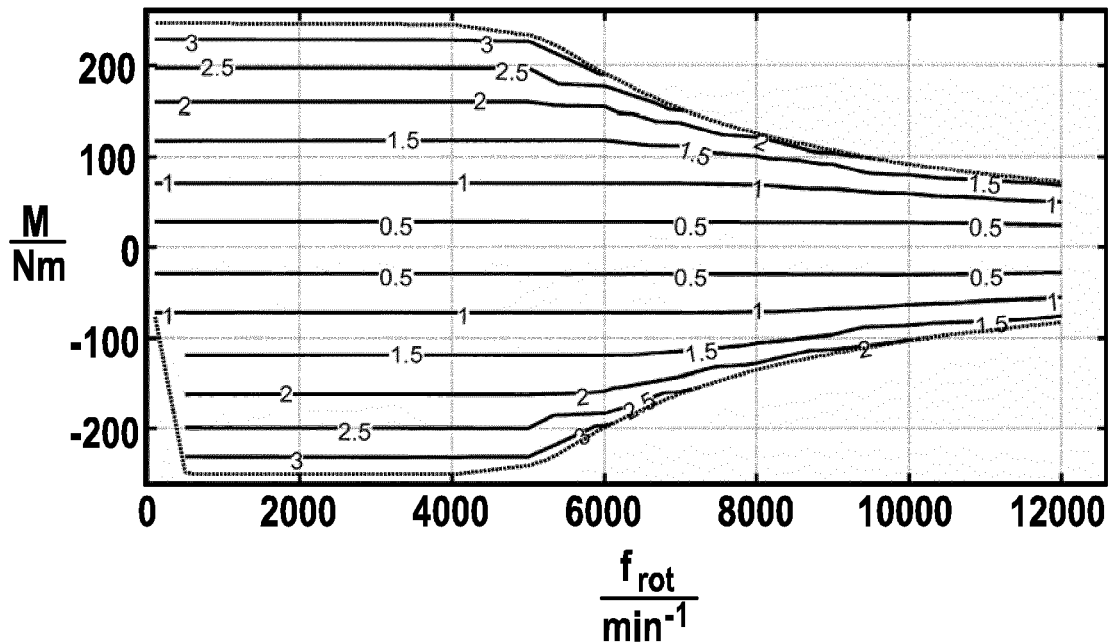
FIG. 4 shows a torque-rotation speed diagram on which total losses of the inverter of the assembly of the prior art have been drawn.

FIG. 3 and FIG. 4 relate to an assembly corresponding to FIG. 1 according to the prior art in which SVM is used. With this assembly it is, however, provided that the carrier frequency is specified at a constant 10 kHz for all the operating points of the torque-rotation speed diagram.

FIG. 3 is a torque-rotation speed diagram on which the WTHD has been drawn for the assembly according to the prior art. The WTHD is illustrated in FIG. 3 by isolines on which a value of the WTHD is given in percent. It can be seen that the WTHD fundamentally rises with increasing rotation speed, and is particularly prominent at torques with low magnitude. A high value of the WTHD can here cause unwanted vibrations in the electric machine 3.

FIG. 4 is a torque-rotation speed diagram on which total losses of the inverter of the assembly according to the prior art have been drawn. The total losses are illustrated in FIG. 4 by isolines on which a value of the total losses is given in kW. To a rough approximation, the total losses at the constant carrier frequency of 10 kHz rise as the magnitude of the torque rises, and are almost independent of the rotation speed.

Figure 5:
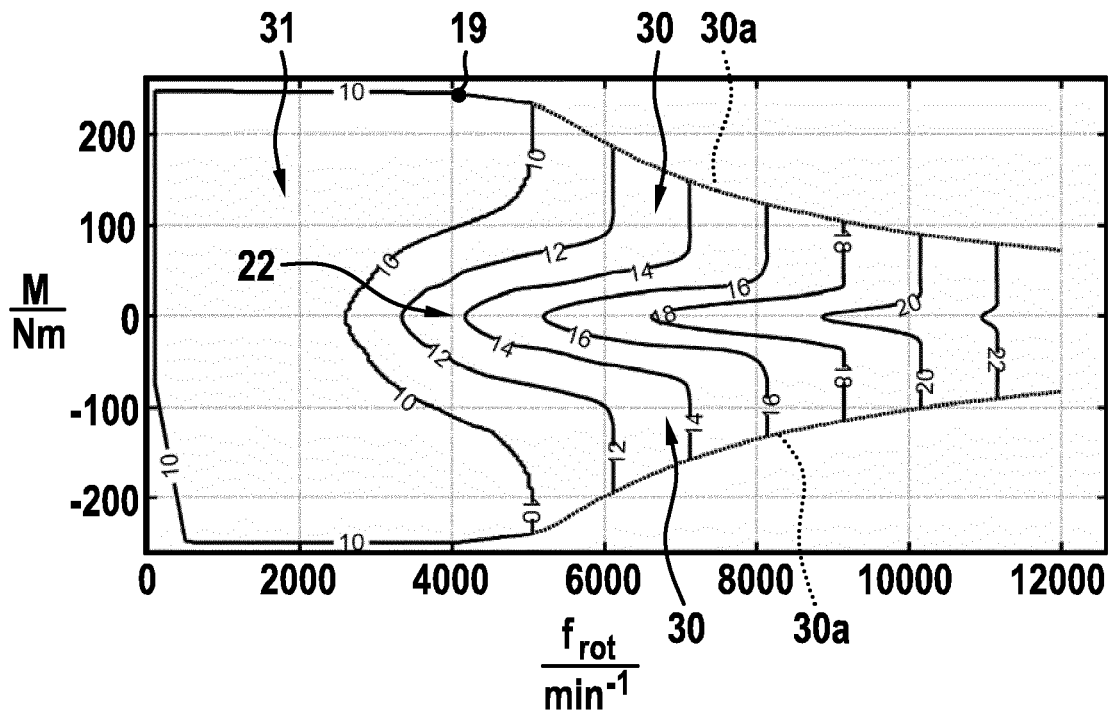
FIG. 5 shows a torque-rotation speed diagram on which carrier frequency values when operating a further exemplary embodiment of the assembly according to the invention have been drawn.
Figure 6:
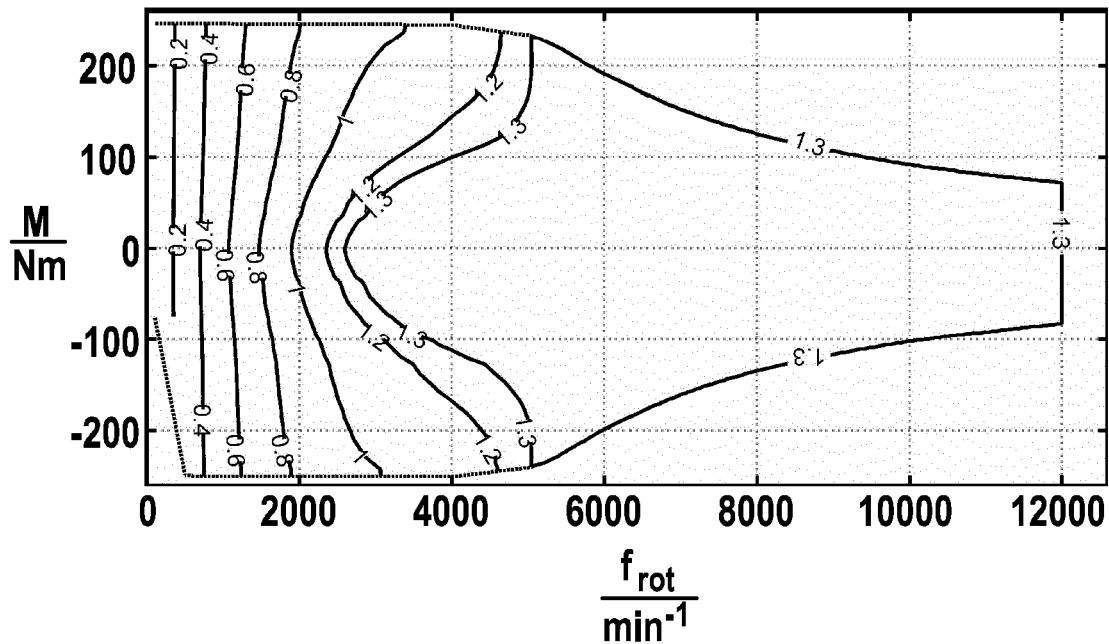
FIG. 6 shows a torque-rotation speed diagram on which the WTHD of the further exemplary embodiment has been drawn.
Figure 7:
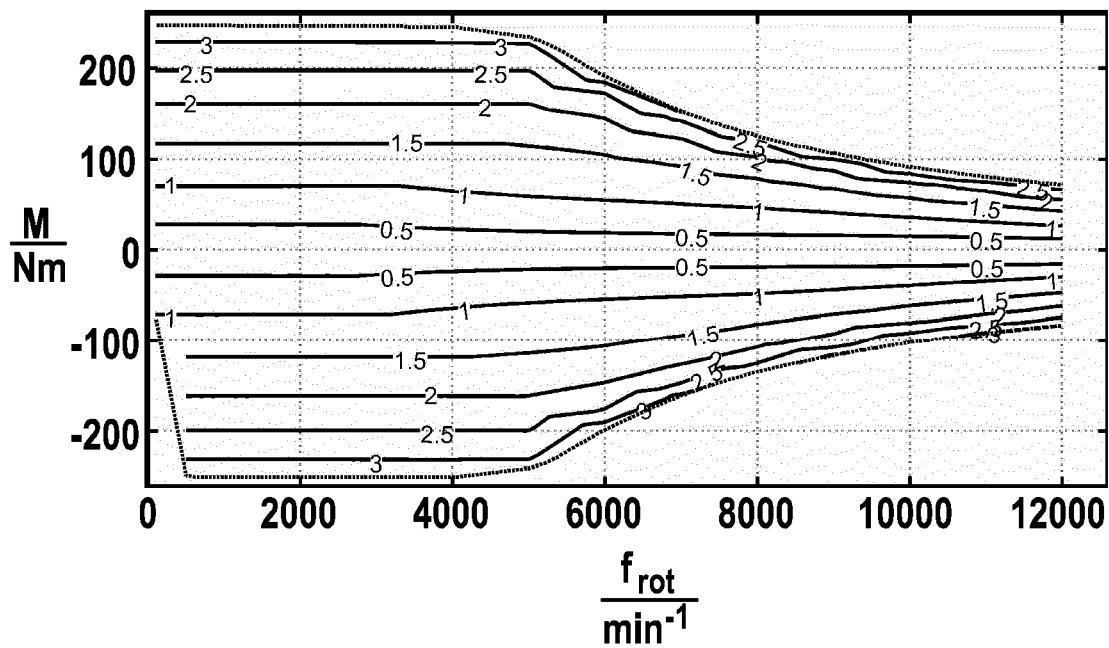
FIG. 7 shows a torque-rotation speed diagram on which the total inverter losses of the inverter of the further exemplary embodiment have been drawn.

FIG. 5, FIG. 6 and FIG. 7 relate to a further exemplary embodiment of the assembly 1 that corresponds to the exemplary embodiment of FIG. 1 and FIG. 2 described above. A concrete design of the assembly 1 is shown here with a characteristic map that extends up to a rotation speed of 12 000 min$^{-1}$, and covers torques between approximately −250 and 250 Nm. The determination of the carrier frequency depends on the operating point. The switching signals 15 are determined by means of SVM.

FIG. 5 is a torque-rotation speed diagram on which carrier frequency values during operation of the further exemplary embodiment have been drawn. The characteristic map has been determined here experimentally or through simulation. The operating regions 22, 30, 31, and the corner operating point 19 are indicated.

FIG. 6 is a torque-rotation speed diagram on which the WTHD has been drawn, wherein the illustration corresponds to FIG. 3. It can be seen from a comparison between FIG. 6 and FIG. 3 that by determining the carrier frequency depending on the operating point, a maximum WTHD value of 1.3% is achieved, and this is significantly lower than a maximum WTHD value of more than 3.0% with the constant carrier frequency specification according to the prior art.

FIG. 7 is a torque-rotation speed diagram on which the total losses of the inverter 2 have been drawn, wherein the illustration corresponds to FIG. 4. It can be seen from a comparison between FIG. 7 and FIG. 4 that the total losses in those regions in which high WTHD values occur with the constant carrier frequency specification, are slightly increased above those of the prior art. The maximum total losses are, however, particularly noteworthy, since the thermal durability of the switching elements 12 must in particular be oriented to this. Advantageously, these are practically unchanged. The carrier frequency specification depending on the operating point thus enables a significant reduction in the total harmonic distortion over wide operating regions of the electric machine 3 without thereby increasing the maximum total losses.

Figure 8:
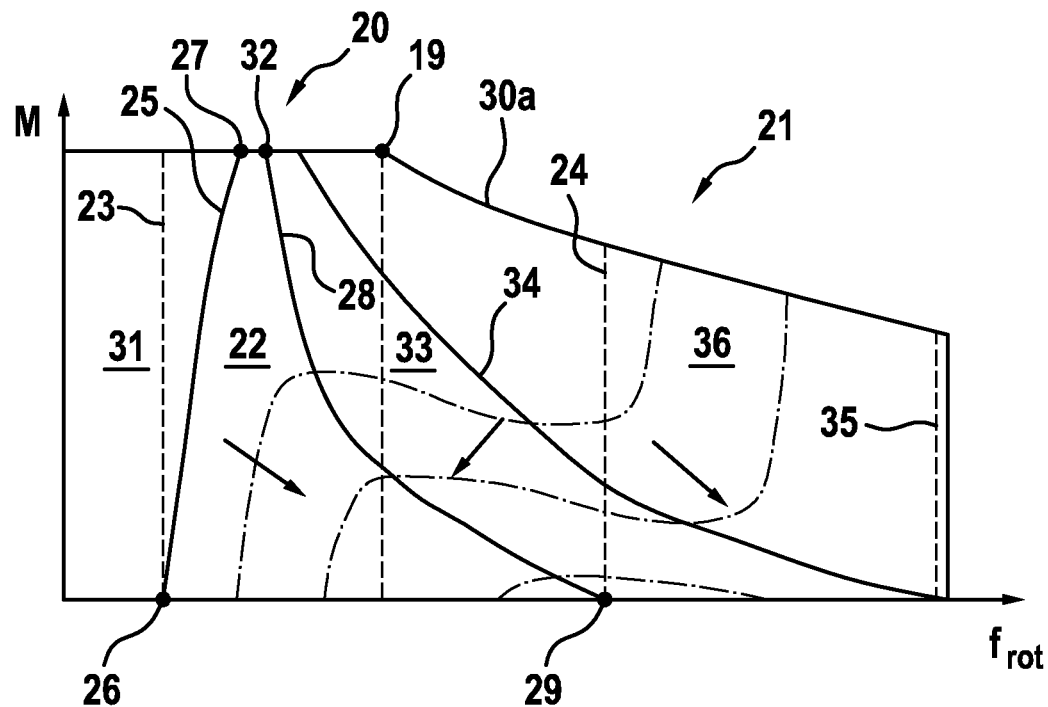
FIG. 8 shows a torque-rotation speed diagram on which operating regions relating to operation of a further exemplary embodiment of the assembly shown in FIG. 1 have been drawn.

FIG. 8 is a torque-rotation speed diagram on which operating regions relating to operation of a further exemplary embodiment of the assembly 1 shown in FIG. 1 have been drawn. In the present exemplary embodiment, the switching signals 15 are determined by generalized discontinuous pulse-width modulation (GDPWM), i.e. using a discontinuous modulation method.

The first operating region 22 is again shown in FIG. 8, within which the carrier frequency is increased with rising rotation speed and falling magnitude of the torque, and which extends between the lower rotation speed limit 23 and the upper rotation speed limit 24 lying in a power-limiting operating region 21 or field-weakening operating region. The first boundary 25 of the first operating region 22 extends from the first operating point 26 lying in the fundamental rotation speed operating region 20, whose rotation speed corresponds to the lower rotation speed limit 23, to the second operating point 27, whose rotation speed is greater than the lower rotation speed limit 23, and the magnitude of whose torque is greater than the magnitude of the torque of the first operating point 26. The second operating point 27, however, also lies in the fundamental rotation speed operating region 20 and the first boundary 27 extends into the full load operating region 30a.

The second boundary 28 of the first operating region 22 extends from the first operating point 29, whose rotation speed corresponds to the upper rotation speed limit 24, to a second operating point 32 which, however, lies in the fundamental rotation speed operating region 20 and the full load operating region 30a, and has a higher rotation speed than the second operating point 27 of the first boundary 25.

FIG. 8 further shows a second operating region 33 of the characteristic map that is defined not to overlap with the first operating region 22, comprising operating points, the magnitude of whose torque at a respective rotation speed is greater than the greatest magnitude of the torque at this rotation speed lying in the first operating region 22. The second operating region 33 is immediately adjacent to the first operating region 22. One boundary 34 of the second operating region 33 extends from an upper rotation speed limit 35 that lies in the power-limiting operating region 21 or field-weakening operating region up to the full load operating region 30a in the fundamental rotation speed operating region 20. The control device 8 is configured to increase the carrier frequency within the second operating region 33 with falling rotation speed and falling torque.

A third operating region 36 is also defined in the characteristic map, and comprises operating points the magnitude of whose torque at a respective rotation speed is greater than the greatest magnitude of the torque at this rotation speed lying in the operating regions 22, 33. The third operating region 36 lies beyond the boundary 34 of the second operating region 33 in the fundamental rotation speed operating region 20 and in the power-limiting operating region 21 or the field-weakening operating region. The control device 8 is configured to increase the carrier frequency within the third operating region 36 with rising rotation speed and falling torque, or alternatively with rising rotation speed independently of the torque.

In other respects, this exemplary embodiment corresponds to the first exemplary embodiment, as was explained with reference to FIG. 1 and FIG. 2.

Figure 9:
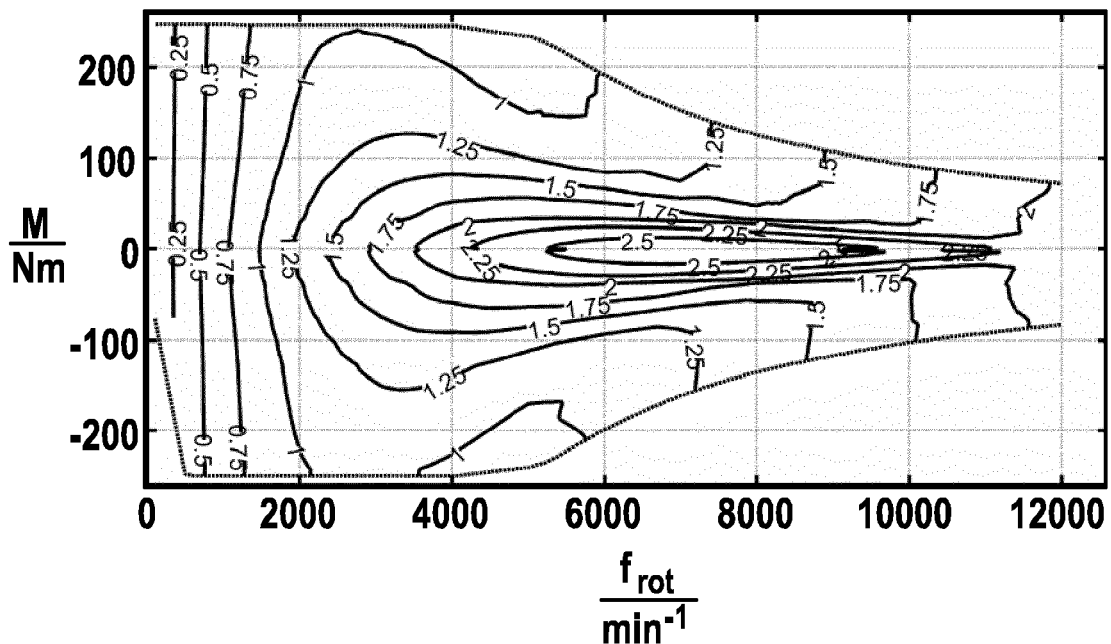
FIG. 9 shows a torque-rotation speed diagram on which the WTHD has been drawn for a further assembly according to the prior art.
Figure 10:
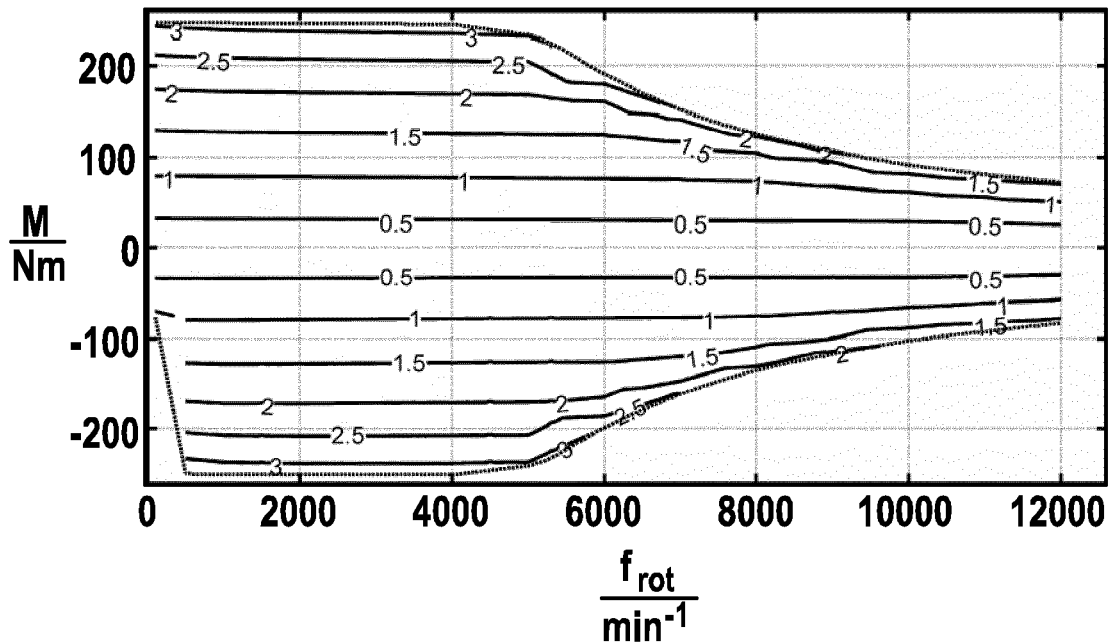
FIG. 10 shows a torque-rotation speed diagram on which total inverter losses have been drawn for the further assembly according to the prior art.

FIG. 9 and FIG. 10 relate to an assembly corresponding to FIG. 1 according to the prior art. With this assembly it is, however, provided that the carrier frequency is specified at a constant 15.9 kHz for all the operating points of the torque-rotation speed diagram, and that GDPWM is used.

FIG. 9 is a torque-rotation speed diagram on which the WTHD has been drawn for the assembly according to the prior art. The WTHD is illustrated in FIG. 9 by isolines on which a value of the WTHD is given in percent. It can be seen that, due to the different type of modulation, the WTHD is distributed differently from when SVM is used according to FIG. 3. As an approximation it can be established here that the WTHD rather adopts higher values for small values of torque. A global maximum of the WTHD however exists at a torque of 0 Nm in the power-limiting operating region or the field-weakening operating region.

FIG. 10 is a torque-rotation speed diagram on which total losses of the inverter of the assembly according to the prior art have been drawn. The total losses are illustrated in FIG. 10 by isolines on which a value of the total losses is given in kW. The distribution of the total losses corresponds approximately to that with SVM according to FIG. 4.

Figure 11:
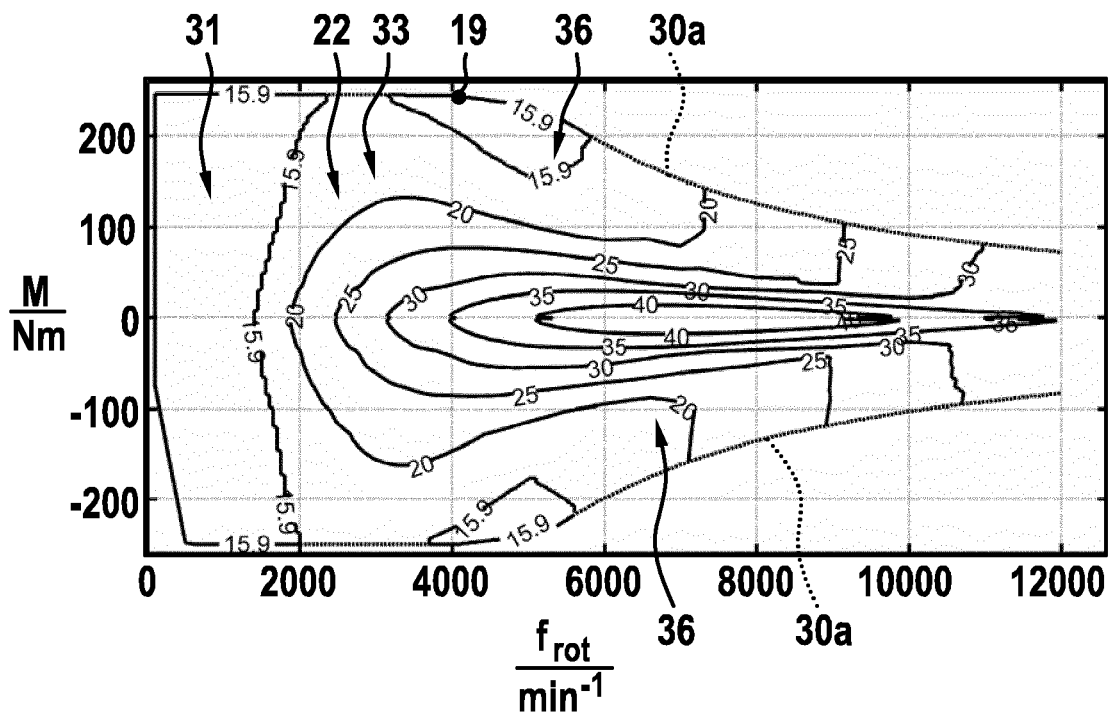
FIG. 11 shows a torque-rotation speed diagram on which carrier frequency values when operating a further exemplary embodiment of the assembly according to the invention have been drawn.
Figure 12:
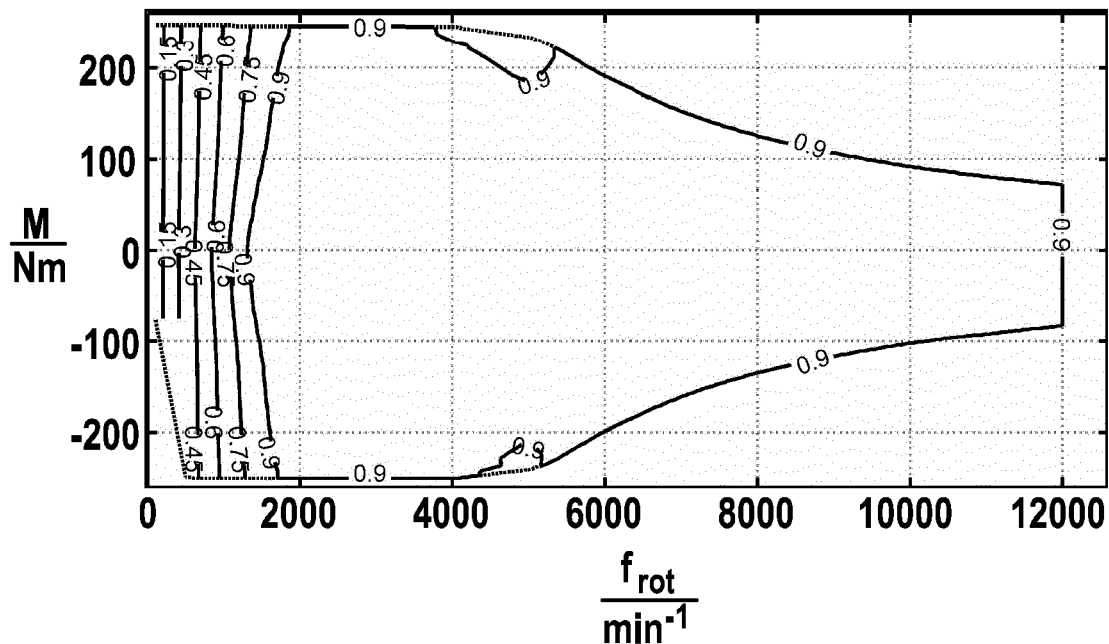
FIG. 12 shows a torque-rotation speed diagram on which the WTHD of the further exemplary embodiment has been drawn.
Figure 13:
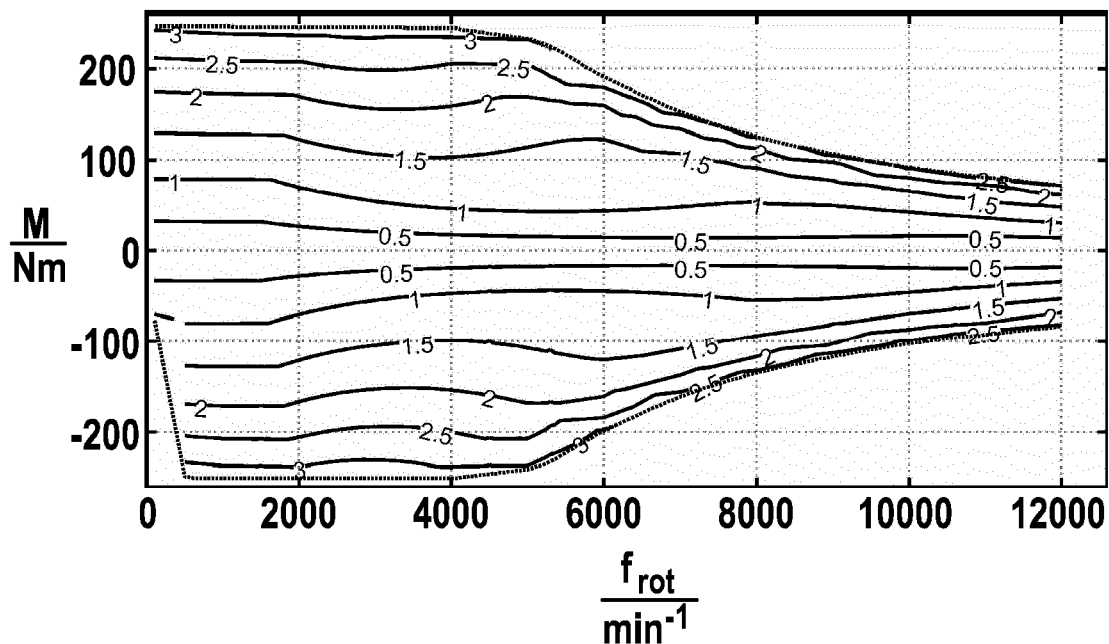
FIG. 13 shows a torque-rotation speed diagram on which the total inverter losses of the inverter of the further exemplary embodiment have been drawn.

FIG. 11, FIG. 12 and FIG. 13 relate to a further exemplary embodiment of the assembly 1 that corresponds to the exemplary embodiment of FIG. 1 and FIG. 8 described above. A concrete design of the assembly 1 is shown here again with a characteristic map that extends up to a rotation speed of 12 000 $min^{-1}$, and covers torques between approximately −250 and 250 Nm. The determination of the carrier frequency depends on the operating point. The switching signals 15 are determined by means of GDPWM.

FIG. 11 is a torque-rotation speed diagram on which carrier frequency values during operation of the further exemplary embodiment have been drawn. The characteristic map has been determined here experimentally or through simulation. The operating regions 22, 31, 33, 36, and the corner operating point 19 are indicated.

FIG. 12 is a torque-rotation speed diagram on which the WTHD has been drawn, wherein the illustration corresponds to FIG. 9. It can be seen from a comparison between FIG. 12 and FIG. 9 that by determining the carrier frequency depending on the operating point, a maximum WTHD value of 0.9% is achieved, and this is significantly lower than a maximum WTHD value of more than 2.5% with the constant carrier frequency specification according to the prior art.

FIG. 13 is a torque-rotation speed diagram on which the total losses of the inverter 2 have been drawn, wherein the illustration corresponds to FIG. 10. It can be seen from a comparison between FIG. 13 and FIG. 10, that the advantages explained with reference to FIGS. 4 and 7 are also achieved through the use of GDPWM.

The following further exemplary embodiments can be based on any of the previously described exemplary embodiments: according to a further exemplary embodiment of the control device 8, the characteristic map is defined by discrete pairs, and the control device 8 is configured to determine the carrier frequency through interpolation, in particular linear interpolation, of the carrier frequency values assigned to the discrete pairs. According to a further exemplary embodiment, the control device 8 is configured to determine the carrier frequency by means of an analytical calculation specification from which a carrier frequency can be determined depending on the operating point instead of on the basis of the characteristic map. According to a further exemplary embodiment, the torque information is not obtained with reference to the current information 16, but is estimated or measured by the control device 8 in the context of a control for determining the switching signals 15.

The invention claimed is:

1. A control device for an inverter that feeds an electric machine, wherein the control device is configured to:
provide pulse-width modulated switching signals with a carrier frequency to drive switching elements of the inverter;
determine the carrier frequency depending on operating point information that describes an operating point defined by a rotation speed and a torque of the electric machine and, as the rotation speed increases and the magnitude of the torque falls, to increase the carrier frequency within an operating region that extends within a rotation speed interval with a lower rotation speed limit differing from zero and with an upper rotation speed limit lying in a power-limiting operating region or field-weakening operating region; and
increase the carrier frequency with rising rotation speed, independent of the torque, within a second operating region defined without overlap with the first operating region, and wherein the second operating region comprises operating points, the operating points having a magnitude of torque at a rising rotation speed that is greater than a greatest magnitude of the torque in the first operating region at the rising rotation speed,
wherein the second operating region extends entirely within the power-limiting operating region or field-weakening operating region or up to full-load operation.

2. The control device as claimed in claim 1, wherein a first boundary of the operating region extends from a first operating point whose rotation speed corresponds to the lower rotation speed limit, to a second operating point, whose rotation speed is greater than the lower rotation speed limit, and the magnitude of whose torque is greater than the magnitude of the torque of the first operating point, and/or wherein a second boundary of the operating region extends from a first operating point, whose rotation speed corresponds to the upper rotation speed limit, to a second operating point, whose rotation speed is lower than the upper rotation speed limit, and the magnitude of whose torque is greater than the magnitude of the torque of the first operating point.

3. The control device as claimed in claim 2, wherein the second operating point lies in a region shared by the first boundary and the second boundary, and the second operating point is spaced apart from a maximum magnitude of the torque at the rotation speed of the respective operating point.

4. The control device as claimed in claim 1, wherein the control device is further configured to generate the pulse-width modulated switching signals through continuous pulse-width modulation, in particular space vector modulation.

5. The control device as claimed in claim 1, wherein the control device is further configured to increase the carrier frequency with falling rotation speed and falling torque, within a second operating region defined without overlap with the first operating region, and wherein the second operating region comprises operating points, the operating points having a magnitude of torque at a falling rotation speed that is greater than a greatest magnitude of the torque in the first operating region at the falling rotation speed.

6. The control device as claimed in claim 5, wherein the control device is further configured to increase the carrier frequency with rising rotation speed and falling torque or with rising rotation speed independently of torque, within a third operating region defined without overlap with the first operating region, and wherein the third operating region comprises operating points, the operating points having a magnitude of torque at a rising rotation speed that is greater than a greatest magnitude of the torque in the first operating region at the rising rotation speed.

7. The control device as claimed in claim 6, wherein the third operating region includes operating points, the operating points having a magnitude of torque at a rising rotation speed is greater than the greatest magnitude of the torque at the rising rotation speed lying in the second operating region.

8. The control device as claimed in claim 7, wherein at least one of the first operating region, the second operating region and the third operating region:
extends or extend into a full-load operating region, or
extends or extend from a fundamental rotation speed operating region into the power-limiting operating region or the field-weakening operating region.

9. The control device as claimed in claim 8, that is configured to generate the pulse-width modulated switching signals through generalized discontinuous pulse-width modulation.

10. An inverter, comprising:
switching elements that are configured, depending on switching signals that control the switching elements, to convert a voltage present at an input side into an alternating current for operating an electric machine; and
a control device as claimed in claim 1.

11. An assembly comprising: an inverter as claimed in claim 10; and an electric machine driven by the inverter.

12. The assembly as claimed in claim 11, wherein the determination of the carrier frequency represents a following relationship:

$$f_{PWM}(M, f_{rot}) = \begin{cases} f_{PWM,m_{THD}}(M, f_{rot}) & \text{for } m_{THD}|_{f_{PWM,min}} > \max(m_{THD}|_{f_{PWM,losses}}) \\ f_{PWM,min} & \text{for } m_{THD}|_{f_{PWM,min}} \le \max(m_{THD}|_{f_{PWM,losses}}) \end{cases}$$

with $$f_{PWM,m_{THD}}(M, f_{rot}) = g(m_{THD}|_{f_{PWM,min}}, \max(m_{THD}|_{f_{PWM,losses}}), f_{PWM,min})$$

and $$f_{PWM,losses}(M, f_{rot}) = \frac{\max(P_{tot}|_{f_{PWM,min}}) - P_c}{P_S|_{f_{PWM,min}}} \cdot f_{PWM,min}$$

wherein:
$f_{PWM}(M, f_{rot})$ describes the carrier frequency to be determined depending on the torque M and the rotation speed $f_{rot}$,
$m_{THD}$ describes a distortion measure for a total harmonic distortion of output voltages of the inverter (2),
$f_{PWM,min}$ describes a predefined or predefinable minimum carrier frequency,
$f_{PWM,losses}(M, f_{rot})$ describes a carrier frequency that depends on the torque M and the rotation speed $f_{rot}$ taking a maximum of a total losses of the inverter at a minimum carrier frequency $\max(P_{tot}|_{f_{PWM,min}})$, switching losses at a minimum carrier frequency $P_S|_{f_{PWM,min}}$ and conductive losses $P_c$ into consideration,
$f_{PWM,m_{THD}}(M, f_{rot})$ describes a carrier frequency depending on the torque M and the rotation speed $f_{rot}$, taking a distortion measure at a minimum carrier frequency $m_{THD}|_{f_{PWM,min}}$ and a maximum of a distortion measure at the carrier frequency $\max(m_{THD}|_{f_{PWM,losses}})$ that depends on losses into consideration, and
$g(m_{THD}|_{f_{PWM,min}}, \max(m_{THD}|_{f_{PWM,losses}}), f_{PWM,min})$ describes a function determined through simulation or measurement, of $m_{THD}|_{f_{PWM,min}}$, $\max(m_{THD}|_{f_{PWM,losses}})$ and $f_{PWM,min}$.

13. A method for operating an inverter for a supply of an electric machine, comprising:
determining a carrier frequency of pulse-width modulated switching signals for operation of the inverter depending on operating point information that describes an operating point defined by a rotation speed and a torque of the electric machine in such a way that the carrier frequency is increased as the rotation speed increases and a magnitude of the torque falls, within an operating region that extends within a rotation speed interval with a lower rotation speed limit differing from zero and with an upper rotation speed limit lying in a power-limiting operating region or field-weakening operating region;
providing the switching signals for switching elements of the inverter;
increasing the carrier frequency with rising rotation speed, independent of the torque, within a second operating region defined without overlap with the first operating region, and wherein the second operating region comprises operating points, the operating points having a magnitude of torque at a rising rotation speed that is greater than a greatest magnitude of the torque in the first operating region at the rising rotation speed; and
extending the second operating region entirely within the power-limiting operating region or field-weakening operating region or up to full-load operation.

14. A non-transitory computer readable medium (CRM) storing instructions for performing an operation carried by a control device, the operation comprising:
determining a carrier frequency of pulse-width modulated switching signals for operation of the inverter depending on operating point information that describes an operating point defined by a rotation speed and a torque of the electric machine in such a way that the carrier frequency is increased as the rotation speed increases and a magnitude of the torque falls, within an operating region that extends within a rotation speed interval with a lower rotation speed limit differing from zero and with an upper rotation speed limit lying in a power-limiting operating region or field-weakening operating region;
providing the switching signals for switching elements of the inverter;
increasing the carrier frequency with rising rotation speed, independent of the torque, within a second operating region defined without overlap with the first operating region, and wherein the second operating region comprises operating points, the operating points having a magnitude of torque at a rising rotation speed that is greater than a greatest magnitude of the torque in the first operating region at the rising rotation speed; and extending the second operating region entirely within the power-limiting operating region or field-weakening operating region or up to full-load operation.

* * * * *